Aug. 4, 1959 A. A. AUERBACH 2,898,457
AMPLIFIER CIRCUIT
Filed Nov. 30, 1954
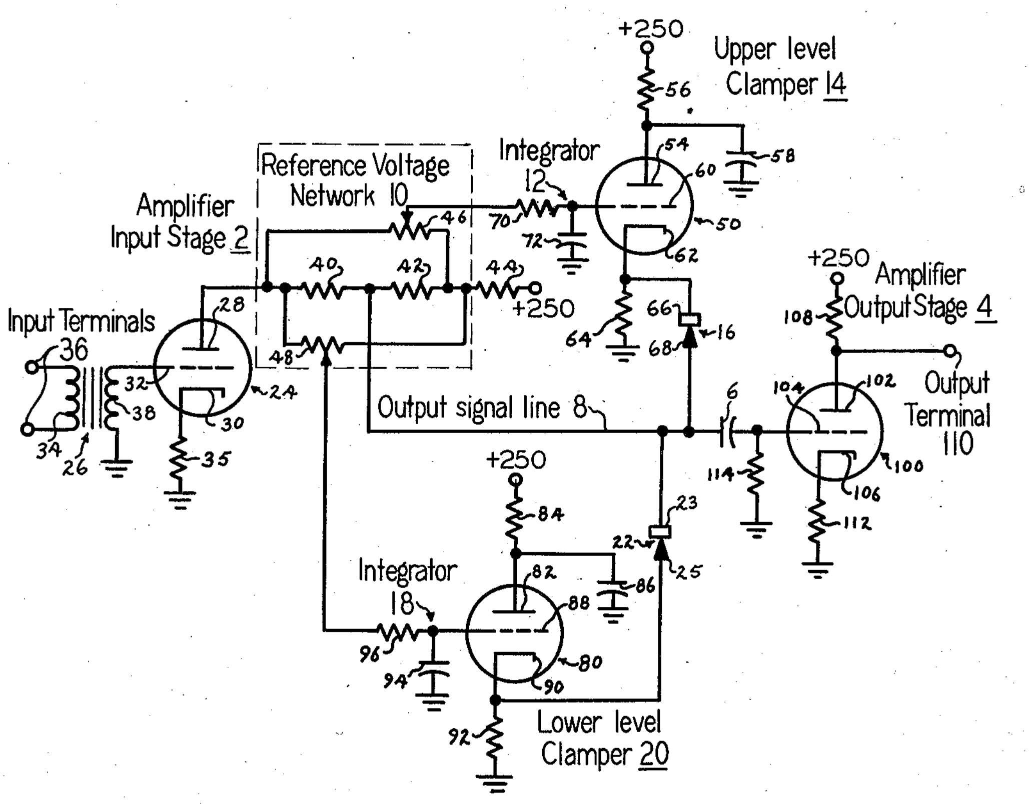
INVENTOR.
ALBERT A. AUERBACH
BY S.C. Yuter
ATTORNEY.

United States Patent Office 2,898,457

Patented Aug. 4, 1959

2,898,457

AMPLIFIER CIRCUIT

Albert A. Auerbach, Hollis, N.Y., assignor to Underwood Corporation, New York, N.Y., a corporation of Delaware Application November 30, 1954, Serial No. 472,061

4 Claims. (Cl. 250—27)

This invention relates to amplifiers circuits and more particularly to circuits for amplifying signals of relatively small amplitudes.

The necessity for amplifying signals of small amplitudes is very common in the electronic field, particularly in the radio, television, radar and magnetic recording fields.

The amplification of relatively small magnitude signals requires a series of amplifier stages which are usually capacitively coupled together. In the early amplifier stages, the magnitudes of the coupling capacitors and associated components such as resistors are chosen to operate effectively at very small signal voltages.

In many electronic applications, the pickup of undesired signals of relatively large magnitudes may occur at the amplifier input circuit. For example, in magnetic recording equipment, it may be necessary to both read and record signals at almost the same time and the "cross-talk" from the magnetic recording head is picked up at the magnetic reading head. Similarly in radar installations, signals are transmitted and received from the same antenna so that the tremendously larger transmitted signal tends to interfere with reception. In radio and television reception, noise signals at the input circuit caused by static and other sources may have amplitudes greatly exceeding the magnitudes of the usual input signal.

In each of these cases, the occurrence of a relatively large signal as compared with the usual signal temporarily overloads the amplifier circuit by causing excess charges to be built up at the coupling capacitors which, because of the circuit constants, do not discharge in time to allow for the amplification of a subsequent signal. Thus, the subsequent signals are not detected so that the information represented by the signals is lost. This phenomenon of amplifier circuit overloading is commonly called "blocking."

One method of preventing the blocking of an amplifier circuit is to prevent the voltage level of a coupling circuit in one of the early amplifier stages from varying above or below prescribed limits. This may be accomplished by employing clamping or limiting diodes which by either conducting or disconnecting when the coupling circuit exceeds a prescribed limit prevents an excessively large signal from being fed to a following coupling capacitor. Unfortunately, these diodes are connected to fixed potential levels related to the average output signal level so that when the circuit components change due to aging or similar causes, the proper amplification of a desired input signal is affected since the average output signal level will change.

An object of the invention, therefore, is to provide an improved nonblocking amplifier circuit.

Another object of the invention is to provide a clamping circuit for the output circuit of an amplifier stage which has clamping levels responsive to changes of the average signal level which result from aging of the vacuum tube and other components.

A further object of the invention is to provide an improved amplifier circuit for signals of relatively small amplitude which is not disabled if a signal of excessively large amplitude occurs.

A still further object of the invention is to provide improved means for amplifying radio, television, radar, magnetically recorded and similar signals immediately after the occurrence of an undesired signal of considerably larger amplitude.

In accordance with the invention, an amplifier circuit is provided for amplifying signals of a relatively low order of magnitude even after the receipt of an undesired signal of unusually large amplitude comprising an amplifier stage having a reference voltage network in the output circuit which supplies an upper reference voltage signal and a lower reference voltage signal. The reference voltage signals correspond generally to the upper and lower prescribed limits of the output signal and are dependent on the average signal levels. Means are provided for maintaining the amplitudes of the reference voltage signals substantially constant during short periods of time. Clamping means are included which are responsive to the reference voltage signals from maintaining the output signal within prescribed limits. Thus, if a signal of unusual magnitude occurs at the input circuit, the potential level of the output circuit will not exceed the prescribed limits so that a coupling capacitor in the following amplifier stage is not excessively charged. Therefore, subsequent input signals are readily amplified.

Other objects, advantages and features of the invention will be evident from the following detailed description which is accompanied by a drawing wherein the sole figure illustrates a nonblocking amplifier circuit in accordance with the preferred embodiment of the invention.

The nonblocking amplifier circuit shown in the drawing includes the amplifier input stage 2 and the amplifier output stage 4. The amplifier output stage 4 is coupled to the output circuit of the amplifier input stage 2 via the coupling capacitor 6 and the output signal line 8. A reference voltage network 10 is associated with the output circuit of the amplifier input stage 2 and is coupled via the integrator 12, and the upper level clamper 14 to the output signal line 8. The reference voltage network 10 is also coupled to the output signal line 8 via the integrator 18, and the lower level clamper 20.

The amplifier input stage 2 includes the vacuum tube 24 and the input transformer 26. The vacuum tube 24 comprises the anode 28, the cathode 30, and the grid 32. The primary winding 34 of the input transformer 26 is connected to the input terminals 36. The secondary winding 38 of the input transformer 26 connects the grid 32 to ground. The cathode 30 is grounded via the resistor 35. The anode 28 is connected to the positive supply source 250 by means of the resistors 40, 42 and 44 in series, with the output signal line 8 coupled to the junction of the resistors 40 and 42.

The reference voltage network 10 includes the potentiometers 46 and 48 each connected in parallel with the resistors 40 and 42 that are in series.

The upper level clamper 14 includes the vacuum tube 50 and the crystal diode 16. The vacuum tube 50 comprises the anode 54, the grid 60, and the cathode 62. The anode 54 is connected to the positive supply source 250 via the resistor 56 and bypassed to ground via the capacitor 58. The grid 60 is coupled to the movable arm of the potentiometer 46 by means of the resistor 70 and is bypassed to ground by the capacitor 72. The cathode 62 is coupled to ground via the resistor 64. The crystal diode 16 has a cathode 66 connected to the cathode 62 of the vacuum tube 50, and an anode 68 connected to the output signal line 8.

The resistor 70 and the capacitor 72 comprise the integrator 12.

The lower level clamper 20 includes the vacuum tube 80 and the crystal diode 22. The vacuum tube 80 comprises the anode 82 which is coupled to the positive supply source 250 via the resistor 84 and to ground via the capacitor 86, the grid 88 and the cathode 90 which is connected to ground via the resistor 92. The crystal diode 22 has a cathode 23 connected to the output signal line 8 and an anode 25 coupled to the cathode 90 of the vacuum tube 80. The grid 88 of the vacuum tube 80 is coupled to ground through the capacitor 94 and to the movable arm of the potentiometer 48 through the resistor 96.

The integrator 18 is composed of the resistor 96 and the capacitor 94.

The amplifier output stage 4 includes the vacuum tube 100 having an anode 102, a grid 104 and a cathode 106. The anode 102 is coupled to the positive supply source 250 via the resistor 108 and to the output terminal 110. The cathode 106 is grounded by means of the resistor 112. The grid 104 is coupled to the output signal line 8 via the capacitor 6 and is connected to ground via the resistor 114.

The operation of the nonblocking amplifier circuit shown in the drawing will be described, by way of example only, in connection with typical operating voltages. Thus, it will be assumed that the potential level at the output signal line 8 will be one hundred and fifty volts in the absence of a signal at the input terminals 36. Assuming an input signal on the order of five millivolts, a voltage step up of twenty at the input transformer 26, and a gain of twenty in the amplifier input stage 2, the output signal on the output signal line 8 will vary from one hundred and forty-eight volts to one hundred and fifty-two volts during normal operation. It will be further assumed that the upper and lower prescribed limits will be one hundred and fifty-two volts and one hundred and forty-eight volts respectively and that the output signal line 8 will be clamped at those voltage limits.

Thus, it is necessary to adjust the potentiometer 46 of the reference voltage network so that the voltage at the cathode 62 of the vacuum tube 50 is one hundred and fifty-two volts, and adjust the potentiometer 48 so that the voltage at the cathode 90 of the vacuum tube 80 is one hundred and forty-eight volts.

Under these conditions the crystal diode 16 will conduct if the potential of the output signal line 8 rises above one hundred and fifty-two volts since the anode 68 will have a higher potential than the cathode 66. Thus, the output signal line 8 will be connected to ground via the resistor 64 which is chosen to have a relatively low impedance. Therefore, the upper level clamper 14 will prevent the potential of the output signal line 8 from becoming greater than one hundred and fifty-two volts. Similarly, the lower level clamper 20 will prevent the potential of the output signal line 8 from going below one hundred and forty-eight volts.

When an undesired signal (which may be in the order of one volt) occurs at the input circuit of the amplifier input stage 2, the potential at the output signal line 8 will be maintained between the upper and lower clamping levels so that the capacitor 6 will not develop an excess charge which would drive the grid current in the vacuum tube 100 positive and prevent the amplification of a subsequent signal. Similarly, a charge of opposite polarity will not be developed across the coupling capacitor 6 to disable the amplifier output stage 4.

The integrators 12 and 18 function to prevent rapid changes of grid voltage at the grids 60 and 88 respectively. Therefore, when an unusually large signal is present at the input terminals, it does not affect the operation of the vacuum tubes 50 and 80 since the time constants of the integrators 12 and 18 are chosen to be considerably larger than the largest period of an undesired signal. However, if the various components of the nonblocked amplifier circuit age or change for any cause, and in particular the vacuum tube and resistors of the amplifier input stage 2, the average output level will also change since this variation of operating voltages occurs over an extended period of time considerably larger than the time constants of the integrators 12 and 18. Consequently, the upper level and the lower level clamping voltages will vary accordingly since the upper and lower reference voltages at the reference voltage network 10 are dependent on the average output voltage level.

Thus, in accordance with the invention, an improved nonblocking amplifier circuit has been provided which is particularly adaptable for amplifying signals of relatively small amplitude even after the occurrence of an undesired signal of excessive magnitude. In addition since the clamping levels are dependent on the average signal level, proper operation of the amplifier circuit will not be affected by normal changes which result from aging of the vacuum tube and other components. Further, the nonblocking amplifier circuit is particularly useful in radio, television, radar and magnetic recording applications where a small input signal and an undesired signal of excessive magnitude may occur at almost the same time.

The following circuit constants may be employed in the practice of the invention. It should be noted that these characteristics are given for purpose of description only and are not intended to limit the scope of the invention since various other constants may readily be employed by one skilled in the art.

| | |
|---|---|
| Vacuum tubes 24 and 100 | one-half section of a 2C51. |
| Vacuum tubes 50 and 80 | one-half section of a 12AT7. |
| Crystal diodes 16 and 22 | 1N91. |
| Resistor 35 | 560 ohms. |
| Resistor 40 | 18,000 ohms. |
| Resistor 42 | 68,000 ohms. |
| Resistor 44 | 10,000 ohms. |
| Resistors 56 and 84 | 1,000 ohms. |
| Resistors 64 and 92 | 10,000 ohms. |
| Resistor 108 | 100,000 ohms. |
| Resistor 112 | 1,000 ohms. |
| Resistor 114 | 470,000 ohms. |
| Potentiometers 46 and 48 and resistors 70 and 96 | 1 megohm. |
| Capacitor 6 | .001 microfarad. |
| Cacapitors 72 and 94 | 1 microfarad. |
| Capacitors 58 and 86 | .5 microfarad. |
| Input transformer 26 | 20:1 step-up transformer. |

There will now be obvious to those skilled in the art many modifications and variations utilizing the principles set forth and realizing many or all of the objects and advantages but which do not depart essentially from the spirit of the invention.

What is claimed is:

1. A nonblocking amplifier circuit comprising a first amplifier having an output signal terminal, the average level of the voltage of said output terminal varying as the characteristics of the components of said first amplifier change, first means including a cathode follower and a voltage integrator to generate a first voltage which is greater than said average voltage level by one-half of a predetermined maximum signal voltage variation, a second means including a cathode follower and a voltage integrator to generate a second voltage which is less than said average signal level by one-half of said predetermined maximum signal voltage variation, a diode connecting said output terminal to said first means to limit the maximum instantaneous voltage of said output terminal to said first voltage, a second diode connecting said output terminal to said second means to limit the minimum instantaneous voltage of said output terminal to said second voltage, and a second amplifier coupled to said output terminal.

2. A nonblocking amplifier comprising a first amplifier having an output signal terminal, the average level of the voltage of said output terminal varying as the characteristics of the components of said first amplifier change, a pair of integrating networks coupled to said output terminal to generate two voltages, each of which is functionally related to said average voltage level, a cathode follower amplifier controlled by each integrating network, the cathode of a first of said cathode followers being thereby maintained at a voltage which is greater than said average voltage level by one-half a predetermined maximum signal voltage variation, the cathode of the other of said cathode followers being thereby maintained at a voltage which is less than said average voltage level by one-half of said predetermined maximum signal voltage variation, a diode having its cathode connected to the cathode of said first cathode follower, a second diode having its anode connected to the cathode of said second cathode follower, the other terminals of said diodes being connected to said output terminal to thereby limit the instantaneous signal voltages on said output terminal, and a second amplifier stage coupled to said output terminal to amplify the signal voltages on said terminal.

3. A nonblocking amplifier including at least two serially coupled amplifier tube stages to amplify input signals and means to limit the amplitude of a signal passing from the first to the second of said amplifier tubes, said signal limiting means comprising an adjustable voltage divider, an integrating network and a cathode follower amplifier connected in series to the output of said first amplifier tube, whereby the cathode of said cathode follower is maintained at a predetermined positive voltage above the average voltage of the output of said first amplifier tube, a second adjustable voltage divider, a second integrating network and a second cathode follower amplifier also connected in series to said output whereby the voltage of the cathode of said second cathode follower amplifier is maintained at a predetermined negative voltage below the average voltage of said output, a diode connecting the output of said first amplifier stage to the cathode of said first cathode follower amplifier to prevent the instantaneous voltage of said output from exceeding the voltage of said cathode and a second diode connected between said output and the cathode of said second cathode follower amplifier to prevent the instantaneous voltage of said output from becoming more negative than the voltage of said cathode of said second cathode follower amplifier.

4. A nonblocking amplifier for an input circuit having a desired signal of one magnitude and an undesired signal of a greater magnitude, said amplifier comprising a vacuum tube amplifier connected to said input circuit and having an output circuit at a positive voltage with the amplified input signal modulated thereon, a second vacuum tube amplifier capacitively coupled to said output circuit to further amplify said amplified input signal, the grid bias of said second vacuum tube amplifier being such than an amplified undesired signal would temporarily block said second vacuum tube amplifier and prevent amplification of an immediately following desired signal, an upper level clamper to limit the maximum positive variation of said modulated positive voltage of said output circuit to that of an amplified desired input signal, said upper level clamper comprising a cathode follower amplifier, a diode having its cathode connected to the cathode of said cathode follower amplifier and its anode connected to said output circuit and an integrating network and voltage divider connected in series between said output circuit and the grid of said cathode follower amplifier, and a lower level clamper to limit the maximum negative variation of said modulated positive voltage of said output circuit to that of an amplified desired input signal, said lower level clamper comprising a second cathode follower amplifier, a second diode having its anode connected to the cathode of said second cathode follower amplifier and its cathode connected to said output circuit and a second integrating network and a second voltage divider connected in series between said output circuit and the grid of said second cathode follower amplifier.

References Cited in the file of this patent

UNITED STATES PATENTS

| | | |
|---|---|---|
| 2,144,995 | Pulvari-Pulvermacher | Jan. 24, 1939 |
| 2,286,442 | Schock | June 16, 1942 |
| 2,299,945 | Wendt | Oct. 27, 1942 |
| 2,329,558 | Scherbatskoy | Sept. 14, 1943 |
| 2,338,412 | Dallos | Jan. 4, 1944 |
| 2,342,238 | Barney | Feb. 22, 1944 |
| 2,345,026 | Boykin | Mar. 28, 1944 |
| 2,434,929 | Holland et al. | Jan. 27, 1948 |
| 2,497,643 | Shea | Feb. 14, 1950 |
| 2,560,709 | Woodward | July 17, 1951 |
| 2,566,832 | Grundmann | Sept. 4, 1951 |
| 2,636,080 | Doba, Jr. | Apr. 21, 1953 |